Sept. 29, 1970   R. E. WHIPPLE   3,531,349
CROSS-WOUND OPEN MESH COIL AND METHOD OF MAKING
Original Filed Nov. 1, 1965   2 Sheets-Sheet 1
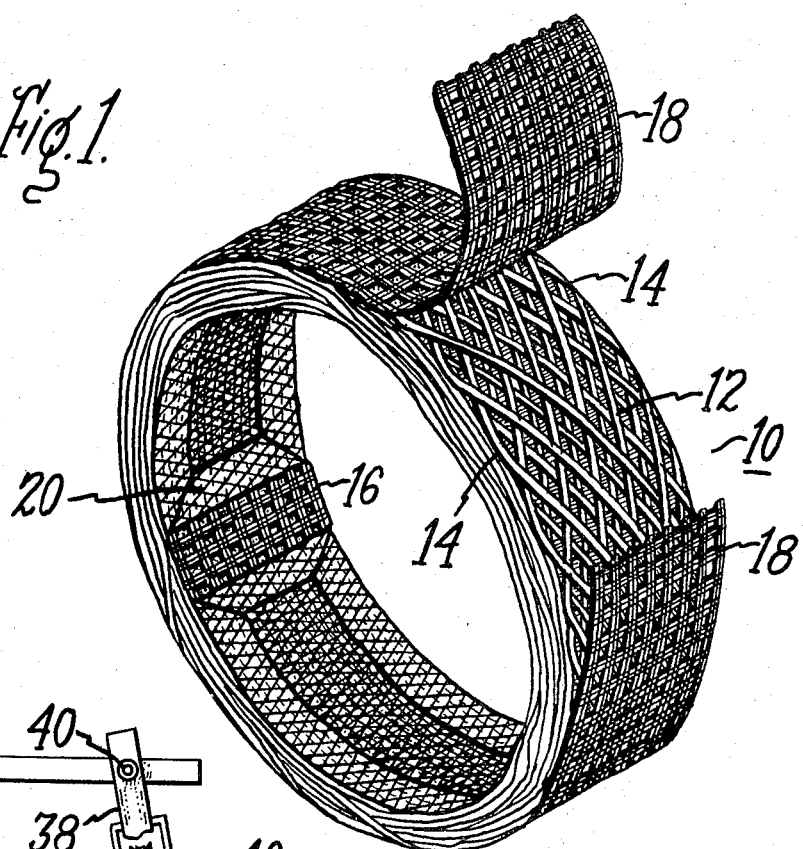
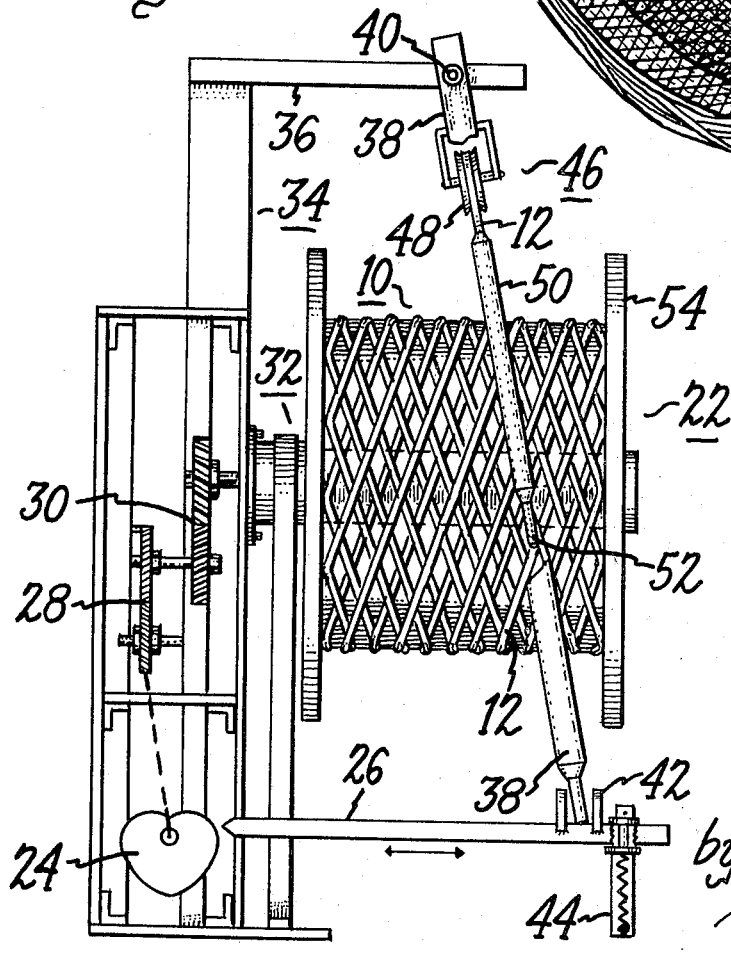
Inventor,
Richard E. Whipple,
by Francis K. Doyle
His Attorney.

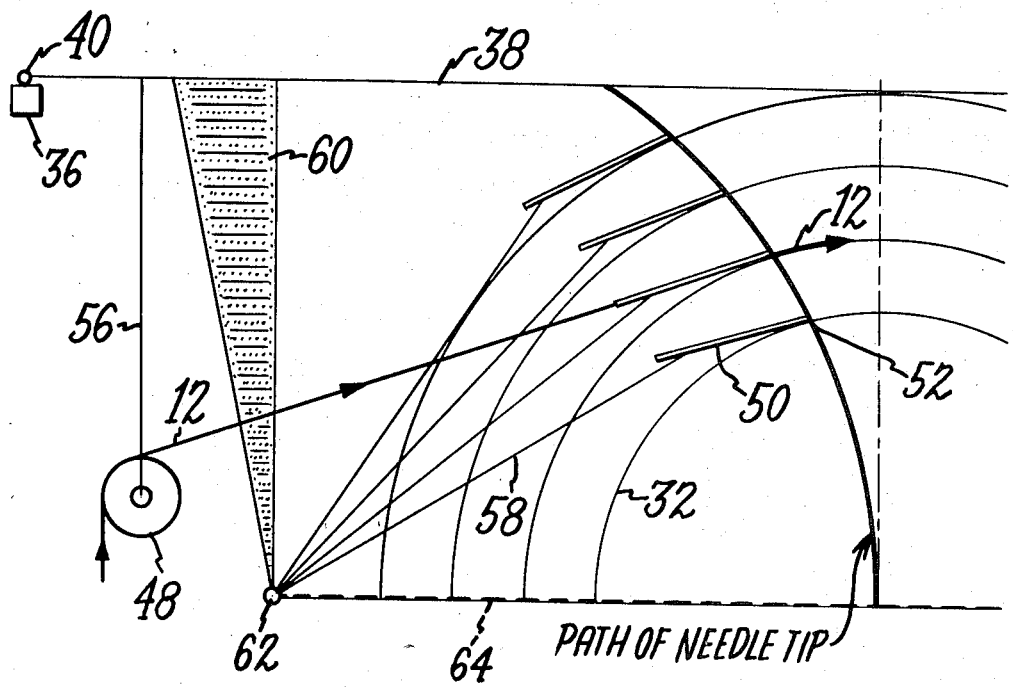

United States Patent Office 3,531,349
Patented Sept. 29, 1970

3,531,349
CROSS-WOUND OPEN MESH COIL AND METHOD OF MAKING
Richard E. Whipple, Rochester, N.H., assignor to General Electric Company, a corporation of New York
Original application Nov. 1, 1965, Ser. No. 505,824, now Patent No. 3,396,356, dated Aug. 6, 1968. Divided and this application Feb. 23, 1968, Ser. No. 730,965
Int. Cl. B65h 81/00
U.S. Cl. 156—173                                       3 Claims

ABSTRACT OF THE DISCLOSURE

A novel cross-wound, open mesh coil and method of winding such coil. The open mesh coil is cross-wound on a flanged arbor using a thin-wall, hollow needle which presses the wire against the flange with a slight overthrow to help position the wire before the next traverse of the wire across the arbor. The cross-over points within the coil are bonded together by an adhesive overcoat on the wire, which is cured. An open mesh resin material is applied to the inner and outer surfaces of the coil and bonded thereto by curing. A specific machine for winding the coil is also disclosed.

---

This is a division of application Ser. No. 505,824, filed Nov. 1, 1965, now Pat. No. 3,396,356 which is assigned to the same assignee as this present application.

This invention relates to high voltage coils and more particularly to cross-wound open mesh coils and to the method of making such coils.

As is well known to those skilled in the electrical art, electrical apparatus is becoming smaller and more compact while at the same time being subjected to greater amounts of electrical current and voltage. Also, greater use is being made of encapsulated components in such electrical apparatus. By "encapsulated" it is generally understood to mean to completely encase a component in an insulating resinous material, with such material completely filling, as far as possible, all voids in the structure of the component. As is well understood, voids in an electrical component subjected to high voltage leads to the development of corona in such voids. The corona generally leads to deterioration of the insulation and subsequent breakdown of the electrical component.

In electrical coil manufacture most coils are wound on an arbor with each layer of the coil wound directly over the preceding layer. The coils are wound as tightly as possible and depend on the insulation of the wire to provide necessary insulation between the various wire turns. For high voltage coils, layer insulation is sometimes placed between each layer of the coil to provide additional insulation between the layers. These types of coils cannot be adequately encapsulated because the encapsulating resin cannot penetrate the interstices of the coil and thus is not able to fill all of the voids between the various turns and layers within the coil. When encapsulated coils of this construction are subjected to high impulse voltages there is a tendency for corona to develop in these unfilled voids. As above noted, this corona will eventually lead to the breakdown of the coil. To overcome these problems a precision wound coil using open mesh insulation between the various layers of the coil has been considered. However, it has been found that such coils cannot be adequately encapsulated without leaving a number of voids within the coil structure.

Another type of coil that has been considered for encapsulation is the cross-wound coil. This coil is sometimes referred to as a "universal" winding. Coils of this type are known in the prior art such, for example, as Pat. No. 1,342,209. The cross-wound or universal coil has generally been used for inductance coils because of the lower distributed capacity of this type of winding. Many attempts to produce a cross-wound coil for high voltage application have been unsuccessful. When wire having adequate enamel insulation has been used in cross-wound coils the turns tend to fall off during winding. These turns provide displaced wires which result in excessive stresses being placed on the insulation between such displaced wires and adjacent wires. When fabric covered wire is used to form such coil, the fabric tends to hold the coil turns in the desired position, but the fabric covering prevents the encapsulating material from filling the voids in the coil.

It has recently been discovered that a cross-wound coil can be made from wire having adequate enamel insulation by use of winding means which firmly position the end turns of the coil against the flanges of an arbor on which the coil is wound. It has also been discovered that after such cross-wound coils have been wound the coils may be dimensionally and physically stabilized by the use of inner and outer layers of epoxy material which may be cured to stabilize the coil prior to removal of the coil from the arbor. It has also been discovered that coating means may be provided over the enamel insulation which may be cured prior to removal of the coil from the winding arbor to stabilize the cross-wound coil.

Therefore it is one object of this invention to provide a novel, cross-wound, open mesh high voltage coil.

A further object of this invention is to provide a dimensionally stabilized cross-wound, open mesh coil which may be readily encapsulated in an insulating resinous material.

A still further object of this invention is to provide a novel method of winding a cross-wound, open mesh high voltage coil.

In carrying out this invention in one form, an open mesh, cross-wound high voltage coil is wound on a flanged arbor by means of a cross feed mechanism which causes the wire of the coil to be firmly positioned against the flanges of the arbor prior to the reverse traverse of the wire feed mechanism. The coil wound according to this invention in one form is an open mesh coil dimensionally and physically stabilized by means of a cured overcoat placed on the wire enamel. According to another form of the invention the cross-wound open mesh coil is dimensionally and physically stabilized by a layer of compatible insulating mesh material bonded to the inner and outer surfaces of the coil.

The invention which is sought to be protected will be particularly pointed out and distinctly claimed in the claims appended hereto. However, it is believed that this invention and the manner in which its various objects and advantages are obtained will be better understood by reference to the following detailed description of various embodiments thereof, particularly when considered in the light of the accompanying drawing, in which:

FIG. 1 is a perspective view of a cross-wound open mesh coil according to one form of this invention;

FIG. 2 is a plan view of one form of winding machine, with portions in phantom, which may be used to wind the coil of FIG. 1; and FIG. 3 is a schematic view of one method of mounting the winding needle on the winding machine.

Reference will now be made to the drawing wherein like numerals are used to indicate like parts throughout the various views thereof. Referring first to FIG. 1 of the drawing, there is shown a cross-wound open mesh coil 10 which comprises a plurality of turns of wire 12. As is clear from FIG. 1, the various turns of wire 12 are cross-wound over the width of the coil 10 forming the desired open mesh coil 10. As will be apparent from FIG. 1, the wire 12 is wound angularly across the width of coil 10, sharply turning at each edge of coil 10, as indicated at 14, and returning angularly across to the opposite edge of coil 10. This, of course, produces an open mesh winding. According to this invention the open mesh coil 10 may be wound with greater than 50% open area within the coil, while providing a dimensionally and physically stabilized coil which may be readily encapsulated with an encapsulating resin which may fill all of the interstices of the coil structure.

In a preferred form of the invention a B stage epoxy glass mesh insulation 16 is placed on a winding arbor prior to winding of coil 10. After the coil 10 is crosswound on the arbor a second layer of B stage epoxy glass insulation 18 is tightly wound about the outside upper surface of coil 10. In FIG. 1 the outer layer of epoxy insulation is shown as pulled back to better show the winding of coil 10. However, it will be understood that the epoxy insulation 18 will be tightly wound about the outer surface of coil 10. After the coil is wound and the B stage epoxy insulation is in place, the coil will be heated to cure the epoxy insulation. The cured epoxy insulation will dimensionally and physically stabilize the coil 10 securing the inner turns and preventing the coil from spreading.

In another form of the invention the coil 10 is wound with wire 12 in which the wire 12 is provided with a coating over the enamel insulation. The overcoat on the enamel insulation is used to lock the adjacent turns of the wire together at their cross-over points. One type of overcoat that provides the desired adhesion of adjacent wires is a polyvinyl butyral resin. After winding of coil 10 it is heated while in place on the arbor. The heating first softens and then cures the overcoat. This curing effectively locks the adjacent turns of wire 12 at their cross-over points. Obviously, other material could be used as the overcoat as long at it is compatible with the wire enamel used.

Of course it will be understood that both the epoxy glass insulation and the overcoat material may be used together if desired. In coils utilizing wire of very small diameter, the overcoat material is particularly useful in providing additional insulation for the coil, as well as providing a more stable coil.

Also shown in FIG. 1 is an electrostatic shield member 20, the shield member 20 is made of expanded metal and used in the manner particularly set forth in application Ser. No. 505,911, filed Nov. 1, 1965 for Electrostatic Shield For Encapsulated Electrical Apparatus, in the name of the present inventor and assigned to the same assignee as this invention. When the electrostatic shield 20 is used it is placed on the winding arbor prior to the inner epoxy mesh insulation 16. Obviously, when the epoxy mesh insulation 16 is cured the shield 20 is firmly bonded to coil 10 in the desired position. Of course, it will be apparent to those skilled in this art that a second electrostatic shield could be placed over the outer epoxy resin insulation 18 and firmly bonded to coil 10 if desired.

The preferred method of making the cross-wound open mest coil of this invention is best shown in FIG. 2 of the drawings. FIG. 2 shows a coil winding machine 22 provided with a cross feed mechanism comprising a cam member 24 and pusher arm or cam follower 26. Of course, it will be understood that cam 24 will be of a preferred shape, according to the form of open mesh winding desired. In the present instance cam 24 is shown as a heart-shaped cam which produces a linear traverse motion with minimum reversal angle. Cam 24 is driven through gears 28 which are driven in synchronism with gears 30. As is shown, gears 30 drive the winding arbor 32. As will be understood gears 28 and 30 are driven from any desired source of power (not shown). The pusher arm 26 will traverse the width of the winding arbor 32 for each rotation of cam 24. The ratio between gears 28 and gears 30 will determine the number of times that pusher arm 26 traverses winding arbor 32 for each rotation of the winding arbor 32. This ratio will determine the amount of open area within the coil 10.

Winding machine 22 is provided with a fixed frame 34 to which is rotatably and movably attached the various components of winding machine 22. Winding frame 34 includes a cross-arm 36, and a pivot arm 38 is provided at one end to the cross arm 36 as shown at 40. The pivot arm 38 is connected at its opposite end to pusher arm 26 as indicated at 42. Pusher arm 26 is spring mounted in mounting means 44 which is fixed to the frame 34. The spring mounting 44 continuously forces pusher arm 26 against cam 24 while allowing the arm 26 to move across the width of winding arbor 32 when pushed by cam 24. Of course, it will be understood that pusher arm 26 and mounting means 44 could be replaced by other types of cam followers, if desired.

The pivot arm 38 shown partially in phantom view, carries a wire feed device 46 which includes a pulley 48, a hollowing guiding finger 50 and a thin-walled, flexible, hollow needle 52. Wire 12 is fed from a feed roller (not shown) over pulley 48 through hollow guide 50 and hollow needle 52 to the winding arbor 32. The stroke of pusher arm 26 is set for a traverse slightly greater than the width of arbor 32. Flanges 54 are provided on the winding arbor 32. Thus when needle 52 is moved by pivot arm 38 and pusher arm 26 to the end of the traverse stroke, the needle 52 will contact one of the flanges 54. With the over travel of arms 26 and 38 the needle 52 flexes against the flange 54, holding wire 12 against flange 54 for a short distance. This allows wire 12 to position itself firmly against flange 54 so that it will not be pulled away from flange 54 when the wire feed mechanism 46 reverses to traverse back across the winding arbor 32. As will be apparent, by the winding method herein described, a flexible needle 52 is provided moving with a traverse stroke slightly greater than the width of winding arbor 32. This provides a dwell of the wire 12 against the flange 54 sufficient to allow wire 12 to be firmly positioned against the flange 54 before the reversal forces of the traverse mechanism are applied to the wire 12. The flanges 54 keep the turns of coil 10 in proper position during the winding preventing wire falling off during the winding operation. As will be apparent from FIG. 2 of the drawing, pivot 40 is positioned along cross arm 36 such that wire guide 50 and needle 52 will swing equal arcs about its center position between flanges 54.

In order to wind relatively thick coils, two or more inches thick, it is necessary that the point of needle 52 should be substantially tangent to the diameter of the coil 10. FIG. 3 shows, in diagrammatic and schematic form, a side view of one means of mounting needle 52 on pivot arm 38 to insure that the needle 52 will remain tangent to the diameter of coil 10 as it is wound on arbor 32. As shown in FIG. 3, arm 38 is pivoted at 40 an cross arm 36. Pulley 48, over which wire 12, is fed, is suspended below arm 38 by pulley support 56 which may be, for example, a U-shaped bracket depending from arm 38. A support arm 58 is provided, to which is connected, at one end, wire guide 50 and needle 52. The opposite end of support arm 58 is pivotally mounted on depending member 60, as at 62. As shown, member 50 is mounted on arm 38 and extends below arm 38 to substantially the center line 64 of winding arbor 32. Of course, it will be understood that pivot point 62 is such that support arm 58 is pivotal only in a vertical direction. Obviously, member 60 and arm 58 must traverse the arbor 32, in the manner indicated in FIG. 2, to provide the desired crosswound coil 10. FIG. 3 shows in phantom lines the plurality of positions taken by support arm 58, wire guide 50 and needle 52 as the thickness of the winding increases on arbor 32.

Of course it will be understood that in using the winding machine 22 either the epoxy glass mesh insulation, such as 16 and 18, or an overcoat, or both such means, may be used to stabilize the finished coil. After the winding 10 is completed on arbor 32 the winding is heated to cure either the epoxy insulation or the overcoat or both to dimensionally and physically stabilize the coil 10.

From the above it will be apparent that by means of this invention a cross wound open mesh coil is provided which may be readily encapsulated in any desired encapsulating resin. The open mesh of the coil will readily allow the encapsulating resin to completely fill all the voids in the winding structure.

While there has been shown and described the present preferred embodiments of this invention, it will be understood that such descriptions are for illustrative purposes only. Obviously, many changes may be made in the various constructional details without departing from the spirit or scope of the invention.

What is claimed as new and which it is desired to secure by Letters Patent of the United States is:

1. A method of winding a cross-wound open mesh coil comprising the steps of: providing a flanged arbor; cross-winding on said flanged arbor a plurality of turns of insulated wire to form an open mesh structure; and holding said wire against one of the flanges of said flanged arbor at the end of each traverse of said wire during cross-winding to prevent pulling away of said wire from said one of said flanges on reversal of the traverse.

2. A method of cross-winding an open mesh coil as set forth in claim 1 in which a layer of epoxy glass mesh insulation is wrapped about said flanged arbor prior to cross-winding said insulated wire turns and a second layer of epoxy glass insulation is wrapped about said open mesh structure, and heating said structure to cure said epoxy glass insulation.

3. A method of winding a cross-wound open mesh coil as set forth in claim 1 in which said insulated wire has an overcoat of compatible adhesive and said open mesh structure is heated on said flanged arbor to cure said overcoat adhesive and bond said turns of insulated wire at their crossover points.

References Cited

UNITED STATES PATENTS

| | | | |
|---|---|---|---|
| 1,080,830 | 12/1913 | Helm | 242—178 X |
| 1,091,046 | 3/1914 | DeWolf | 242—178 X |
| 1,203,789 | 11/1916 | Ryden | 242—178 X |
| 1,845,116 | 2/1932 | Apple | 156—175 X |
| 2,505,104 | 4/1950 | D'Orio | 156—175 |
| 2,661,446 | 12/1953 | Adcock | 242—7.07 X |
| 2,780,742 | 2/1957 | Jenner et al. | 336—205 X |
| 3,038,831 | 6/1962 | Rosenberg | 156—173 X |
| 3,352,009 | 11/1967 | Cohn et al. | 156—173 X |
| 3,356,226 | 12/1967 | Miller et al. | 242—35.5 X |

FOREIGN PATENTS

| | | |
|---|---|---|
| 735,198 | 4/1943 | Germany. |
| 1,042,614 | 11/1953 | France. |

JOHN T. GOOLKASIAN, Primary Examiner

J. C. GIL, Assistant Examiner

U.S. Cl. X.R.

156—175, 425; 242—7.07, 158